United States Patent [19]

Yoder

[11] Patent Number: 5,099,636
[45] Date of Patent: Mar. 31, 1992

[54] VINOUS ROW CROP HARVESTING APPARATUS AND METHODS

[76] Inventor: Joseph A. Yoder, 101 Fairfield Rd., Lewisburg, Pa. 17837

[21] Appl. No.: 582,712

[22] Filed: Sep. 13, 1990

[51] Int. Cl.⁵ .................................................. A01D 45/00
[52] U.S. Cl. .................................................. 56/327.1
[58] Field of Search .................... 56/327.1, 328.1, 329, 56/13.9

[56] References Cited

U.S. PATENT DOCUMENTS

| | | | |
|---|---|---|---|
| 3,252,464 | 5/1966 | Hill et al. | 130/30 |
| 3,344,592 | 10/1967 | Christie et al. | 56/330 |
| 3,455,453 | 7/1969 | Hill et al. | 209/396 |
| 3,618,617 | 11/1971 | Gates et al. | 130/30 |
| 3,666,017 | 5/1972 | Gates et al. | 171/27 |
| 3,760,574 | 9/1973 | Tassone | 56/330 |
| 3,959,959 | 6/1976 | Loualt et al. | 56/330 |
| 3,986,561 | 10/1976 | Bettencourt et al. | 171/14 |
| 4,033,099 | 7/1977 | Friedel, Jr. et al. | 56/327 |
| 4,111,210 | 9/1978 | Freeman et al. | 130/30 |
| 4,147,017 | 4/1979 | Cortopassi et al. | 56/165 |
| 4,157,005 | 6/1979 | Orlando et al. | 56/228 |
| 4,232,506 | 11/1980 | Studer | 56/327 R |
| 4,234,045 | 11/1980 | Porter | 171/14 |
| 4,261,163 | 4/1981 | Shaw | 56/327.1 |
| 4,335,570 | 6/1982 | Fitzmaurice | 56/327.1 |
| 4,365,463 | 12/1982 | Bettencourt et al. | 56/327 |
| 4,570,426 | 2/1986 | Bettencourt et al. | 56/327 |

Primary Examiner—Thuy M. Bui

[57] ABSTRACT

Apparatus for harvesting vinous row crops, such as tomatoes, by cutting the vines of a crop from their growing roots; receiving the vines from the cutter and imparting vibratory motion to the vines to break fruit from the vine by utilizing a first rotatable shaker.

24 Claims, 5 Drawing Sheets

VINOUS ROW CROP HARVESTING APPARATUS AND METHODS

FIELD OF THE INVENTION

This invention relates to harvesting vinous row crops, particularly tomatoes

BACKGROUND OF THE INVENTION

Botanists and agronomists are continuously developing new and improved varieties of tomatoes for commercial processing. Typically botanists and agronomists seek to develop tomatoes providing higher yield per unit area of growing space; that is, more tomatoes of greater weight per vine or per given space in the field. Additionally, botanists seek to develop tomato varieties having improved resistance to wilt and other funguses, improved resistance to drought and to excessively wet conditions, improved resistance to disease and to insect infestation and in which a high percentage of the fruit ripens at the same time.

Unfortunately, while botanists have developed tomato varieties for commercial canning purposes having the aforementioned improved characteristics, these newly developed tomato varieties demonstrate strong adherence of the ripe fruit to the tomato vines, making the ripe fruit difficult to harvest mechanically. This is especially true if the growing season has been dry. Currently many of the most popular commercially grown tomatoes, including many tomato varieties which are specified by commercial canneries and food processors (farmers growing tomatoes under contract for such canneries and food processors must grow the specified variety) are varieties which exhibit substantial and effective strength where the ripe fruit attaches to the tomato vine. These varieties of tomatoes are appropriately called "hard to shake varieties" in the trade and include popular commercial varieties whose seeds are identified as "7151 Heinz" and "1810 Heinz" specified by H. J. Heinz Foods, Inc., as "8245 Ohio Seed" developed by Ohio State University, as "U.S. Seed 68" developed by the United States Department of Agriculture, as "UC 82 B" developed by the University of California and as "696", "1596" and "2196" all developed by and available from Peto Seed Co., Inc., in Santicoy, Calif.

Current commercially available tomato harvesting equipment, when used to harvest these "hard to shake" tomato varieties, customarily leaves from about 3 to about 5 percent by weight of the fruit of these varieties on the tomato vines, when operating under conditions typically encountered in the northeast, southeast and mid-west sections of the United States.

DESCRIPTION OF THE PRIOR ART

Typically, mechanical tomato harvesting, chain-type conveyers have been used to convey a tomato vine mass, either before or after the tomatoes have been shaken from the vine mass. Unfortunately, chain-type conveyers are especially susceptible to fouling in wet conditions, by mud, weeds and/or rocks. When conventional tomato harvesting apparatus and methods are used in the northeast and midwestern parts of this country, where rocks are relatively common and where muddy conditions must be addressed (as contrasted to the west where irrigation is used and the irrigating water can be removed from the field several days before the fruit is picked, thereby providing dry conditions for the harvest), apparatus utilizing chain-type conveyers is prone to breakdown and frequent work stoppage while mud and/or other materials, fouling the chains, is removed therefrom.

Vine chains are a high maintenance item when used in tomato harvesting machinery. Dirt carried with the vines gets into the chains and inhibits proper pivoting operation of the chain links. Additionally, vine chains tend to carry the vines with the chains; the vines tend to build-up on the chains. The vines must be cleared from the chains which requires that the tomato harvesting apparatus, utilizing the vines chains to convey the vines, be stopped. This must be done up to ten times a day to remove build-up of vines from the chains. Of course, when the apparatus is stopped, the harvesting procedure ceases. Removing the built-up vines from the chains, which consumes between about 5 and about 10 minutes each time, can result in the loss of up to about 2 hours per work day eight hour shift. Vine build-up results because the vines, due to their inherently elongated nature and structure, tend to follow the chains as the endless chains travel over rollers and pulleys in the harvesting apparatus.

SUMMARY OF THE INVENTION

This invention is premised in part on the discovery that specific configurations of harvesting apparatus and methods of harvesting, when used to harvest commercially grown tomatoes for commercial canning and other processing, provide substantially higher yield, in terms of fruit successfully removed from the tomato vines, than apparatus and methods known heretofore.

This invention is further premised on providing tomato harvesting apparatus and methods which do not use chain-type conveyers, which heretofore have been extremely popular in commercial tomato harvesting apparatus. This invention provides apparatus and methods for harvesting tomatoes providing improved reliability especially under conditions in which mud, weeds and rocks may be encountered.

Apparatus embodying the invention has demonstrated substantial increases in yield when used to pick "hard to shake" tomato varieties under conditions typically encountered in the eastern part of the United States. In a normal field conditions encountered in the northeastern part of the country, when picking "hard to shake varieties" apparatus embodying the invention has removed up to about 99.5% of the tomato fruit from the tomato vines; only about 0.5% by weight of the fruit has been left attached to the vines and lost as the vines discharge onto the ground.

In one of its aspects, this invention provides apparatus for harvesting vinous row crops such as tomatoes which includes means for cutting a fruit-carrying vine mass of the crop from its growing roots. The apparatus further includes first means, receiving the vine mass from the cutting means, for imparting vibratory motion to the vine mass, to separate or to break fruit from the vines of the vine mass. The first means for imparting vibratory motion to the vine mass includes a first rotatable shaker, means for rotating the first shaker and means for imparting vibratory motion to the first shaker during rotation. The first means for imparting vibratory motion to the vine mass further includes means protruding outwardly from the shaker for engaging the vine mass and carrying the vine mass over the first shaker as the first shaker rotates.

The apparatus further includes means, located below the first means for imparting vibratory motion to the vine mass, for catching fruit broken from the vines and conveying that fruit to a fruit discharge position. The catching and conveying means further conveys a vine mass portion, which remains upon disengagement from the first shaker, to a position of engagement with second means for imparting vibratory motion to such remaining vine mass portion to thereby free entrapped fruit therefrom.

Preferably the second means for imparting vibratory motion to the vine mass remaining portion includes a second rotatable shaker and means for drivingly rotating the second shaker including means for imparting vibratory motion to the second shaker during rotation thereof. Preferably yet further included are means extending from the second shaker for engaging the remaining vine mass portion received from the catching and conveying means, thereby carrying the remaining vine mass over the second shaker as the second shaker rotates. Preferably the fruit catching and conveying means extends under the second vibratory motion imparting means to catch and convey fruit which had been broken from the vines but had remained entrapped within the vine mass to the fruit discharge position.

The invention further encompasses a method for harvesting tomatoes which includes the steps of cutting a tomato carrying vine mass from its growing roots, carrying the vine mass along a first arcuate path by first lifting the vine mass and thereafter lowering the vine mass while simultaneously imparting vibratory motion to the vine mass to break tomatoes from the vines of the vine mass. The method further preferably includes catching tomatoes broken from the vines of the vine mass and conveying those tomatoes to a tomato discharge position. The method of the invention further preferably encompasses carrying the remaining vine mass portion along a second arcuate path by first lifting the remaining vine mass portion and then lowering the remaining vine mass portion while imparting vibratory motion to the vine mass remaining portion. The method further encompasses the step of catching falling tomatoes, which had been broken from the vines but remained entrapped in such vine mass, and conveying these caught tomatoes to the tomato discharge position. In practicing the method, the first vibratory motion is preferably of greater amplitude than the second vibratory motion applied to the vine mass. Additionally, in practicing the method, the second vibratory motion is preferably of higher frequency than is the first vibratory motion.

Figure 1:
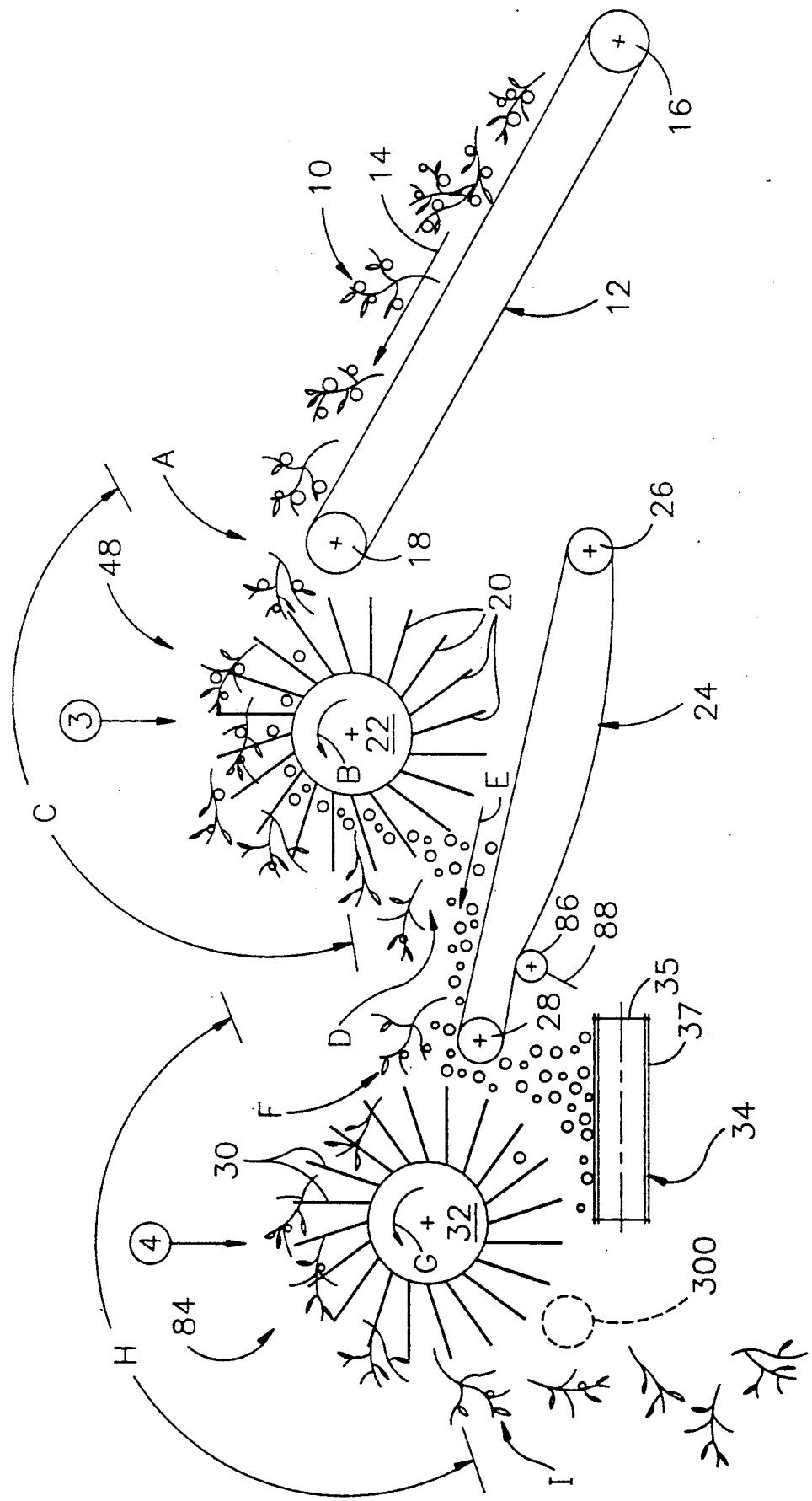
FIG. 1 is a schematic side elevation depicting aspects of the invention in the preferred embodiment.

Reference numerals and characters appearing in the drawings are used below in describing the invention. In the drawings and in the text, prime notation denotes an alternate embodiment of the invention. Numbers and characters having prime notation denote components corresponding to components identified with the same numbers but lacking prime notation in the preferred embodiment of the invention.

DESCRIPTION OF THE PREFERRED EMBODIMENTS AND BEST MODE KNOWN FOR PRACTICING THE INVENTION

Figure 6:
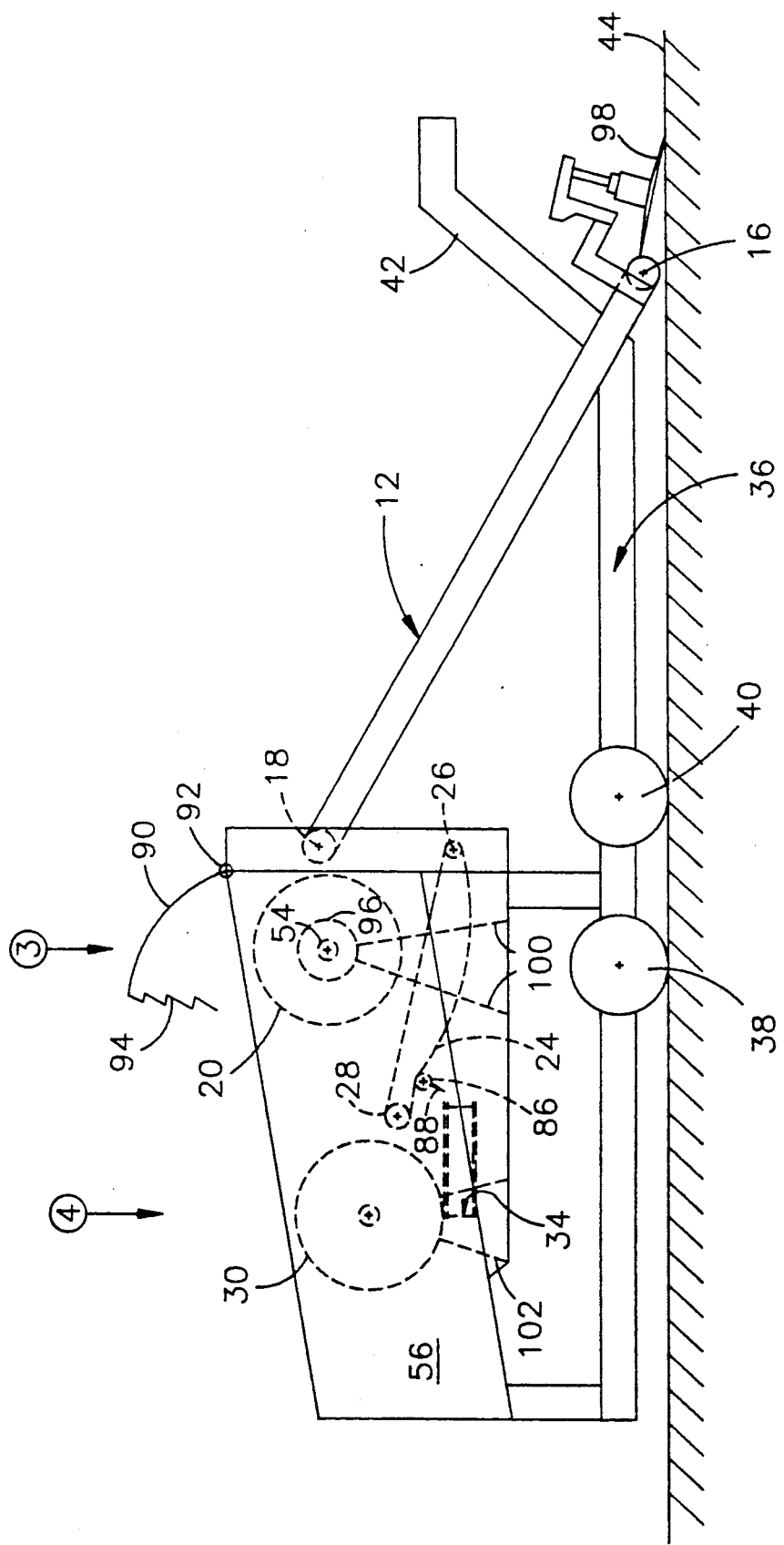
FIG. 6 is a side elevation of apparatus manifesting the preferred embodiment of the invention.

Referring to FIGS. 1 and 6, a tomato vine mass having, tomatoes growing thereon is cut by suitable cutting means 98, which is preferably of the conventional, double disk variety, and transported by a conveyer 12 upwardly, in the direction indicated by arrow 14, to a position, designated by arrow A, for engagement of vine mass 10 with tines 20 of a first or primary shaker assembly designated generally 48. In FIG. 6, the dotted circular outline denotes the path defined by the tips of tines 20 protruding from hub 22; tines 20 are illustrated in FIG. 1. At position A, tines 20, moving upwardly due to rotation of hub 22 in the direction indicated by arrow B, engage the vine mass 10. Tines 20 then proceed to lift and carry vine mass 10 through a arcuate path subtending an angle C in FIG. 1. Tines 20 carry vine mass 10 to a disengagement position D. Upon arriving at position D, the vine mass remaining, which has had the ripe tomatoes substantially shaken therefrom by vibration of first shaker assembly 48, specifically by vibration of hub 22 and tines 20, disengages from tines 20 by sliding radially outwardly and downwardly therefrom. Tomato fruit broken from the tomato vines falls onto a conveyer 24 moving in the direction indicated by arrow E in FIG. 1; the falling tomato fruit, while illustrated in FIG. 1, has not been numbered.

At disengagement position D, the remaining vine mass falls onto tomato fruit being carried by conveyer 24. The vine mass rides on top of the fruit until it reaches position F for engagement with tines 30 of a second or secondary shaker assembly designated generally 84. A few tomatoes loosened from the vines by the primary shaker may still be embedded within the vine mass.

Conveyer 24 rotates about rollers 26, 28 in a conventional manner; at least one of rollers 26, 28 is driven to move conveyer 24. In the preferred embodiment roller power is provided by a hydraulic motor connected to the conventional tractor power apparatus which powers the tomato harvesting invention; the conventional tractor preferably pulls the tomato harvesting apparatus of the invention. However, it is to be understood that the invention may also be used in a self-propelled tomato harvesting apparatus. It is further to be understood that independent power may be utilized so that the tomato harvesting apparatus need not use the power take-off from the tractor pulling the apparatus.

Conveyer 24 slopes upwardly from roller 26 to roller 28 and thereby conveys the harvested tomato fruit uphill, in the direction indicated by arrow E. This uphill carriage of the fruit which has been separated from the tomato vines permits rocks, dirt and other debris, which has been dislodged from the vine mass by the shaking action of primary shaker hub 22 and tines 20, to roll or fall down conveyer 24, to the right in FIG. 1, where the rocks, dirt and other debris falls off conveyer 12 and out of the tomato harvesting apparatus.

At position F, tomatoes carried by conveyer 24 fall therefrom (thereby defining a tomato discharge position) onto a fruit carriage conveyer 34. Fruit carriage conveyer 34, similarly to conveyers 12 and 24, preferably includes a plurality of elongated slats, two which are shown in section in FIG. 1 and are designated 35, 37 respectively. Fruit carriage conveyer 34 travels in a direction transverse to the plane of the drawing paper thereby transporting tomatoes away from the shaking mechanisms defined by the combinations of shaker hubs 22, 32 and tines 20, 30, and the associated structure discussed below, to a position at which ripe tomatoes can be sorted from green tomatoes and from any waste which may be carried with the tomatoes. This sorting may be done electronically, electromechanically or manually.

Fruit carriage conveyer 34 is driven by conventional rollers which may rotate about the unnumbered center line illustrated in FIG. 1. The rollers and associated driving motor for fruit carriage conveyer 34 have not been illustrated, to enhance drawing clarity.

Fruit carriage conveyer 34 is positioned to receive fruit falling from position F and also to receive fruit falling from the vine mass travelling on tines 30 of secondary shaker hub 32. The vibration or oscillatory shaking action of shaker hub 32 and tines 30, which action is similar to that of primary hub 22 and tines 20, serves to quickly dislodge tomatoes which had been broken from the vines but which remained embedded in the vine mass. Such dislodged fruit falls through tines 30 onto fruit carriage conveyer 34 for transport to the fruit sorting position.

The "remaining vine mass", which engages tines 30 at engagement position F, travels on tines 30 first upwardly and then downwardly along an arcuate path which subtends an angle H as illustrated in FIG. 1. When vines travelling on tines 30 reach disengagement position I, the vines slide off tines 30 and are discharged from the tomato harvesting apparatus onto the ground. The vibration of secondary shaker hub 32 and tines 30, together with the rotary motion of secondary shaker hub 32 and the radially skew orientation of tines 30 respecting shaker hub 32 which is discussed below, all contribute to the vines, which define the "remaining vine mass", disengaging from tines 30 at position I. As a result, it is unusual for a vine or a vine fragment to land on fruit carriage conveyer 34 and be transported to the fruit sorting position.

Tomato harvesting apparatus having the configuration illustrated generally in FIG. 1 has demonstrated surprising, greatly improved yield efficiency when harvesting popular "hard to shake" commercially grown varieties of tomatoes. The precise reason for this improvement in operating efficiency is not known. However, it seems that the combination of the up and then down movement of the fruit and the vine mass while being shaken by the primary shaker hub 22 and tines 20 and the action of the secondary shaker, which frees fruit that had been separated from the vines but remained embedded in the vines and hence was not free to fall, with the second shaker also employing the up and then down conveyance of the remaining vine mass, produces the improved yields.

The invention has regularly demonstrated operating efficiencies on the order of about ninety-nine and one-half (99.5) by weight percent of the tomatoes being removed from the vines prior to vine discharge. This represents a six fold reduction in fruit loss, as compared to the conventionally commercially accepted figure of from about five percent (5%) to about three (3%) percent of the crop being lost by remaining attached to the vines.

Note respecting the embodiment illustrated in FIG. 1 that no conveyer chains, which are so popular and widely used in prior art devices, are present. Absence of such conveyer chains results in the tomato picking apparatus of the invention having substantially enhanced reliability and substantially increased available picking time, as contrasted to down time, in the field in the relatively harsh northeastern tomato picking environments, in comparison to machines used heretofore in those areas.

Figure 2:
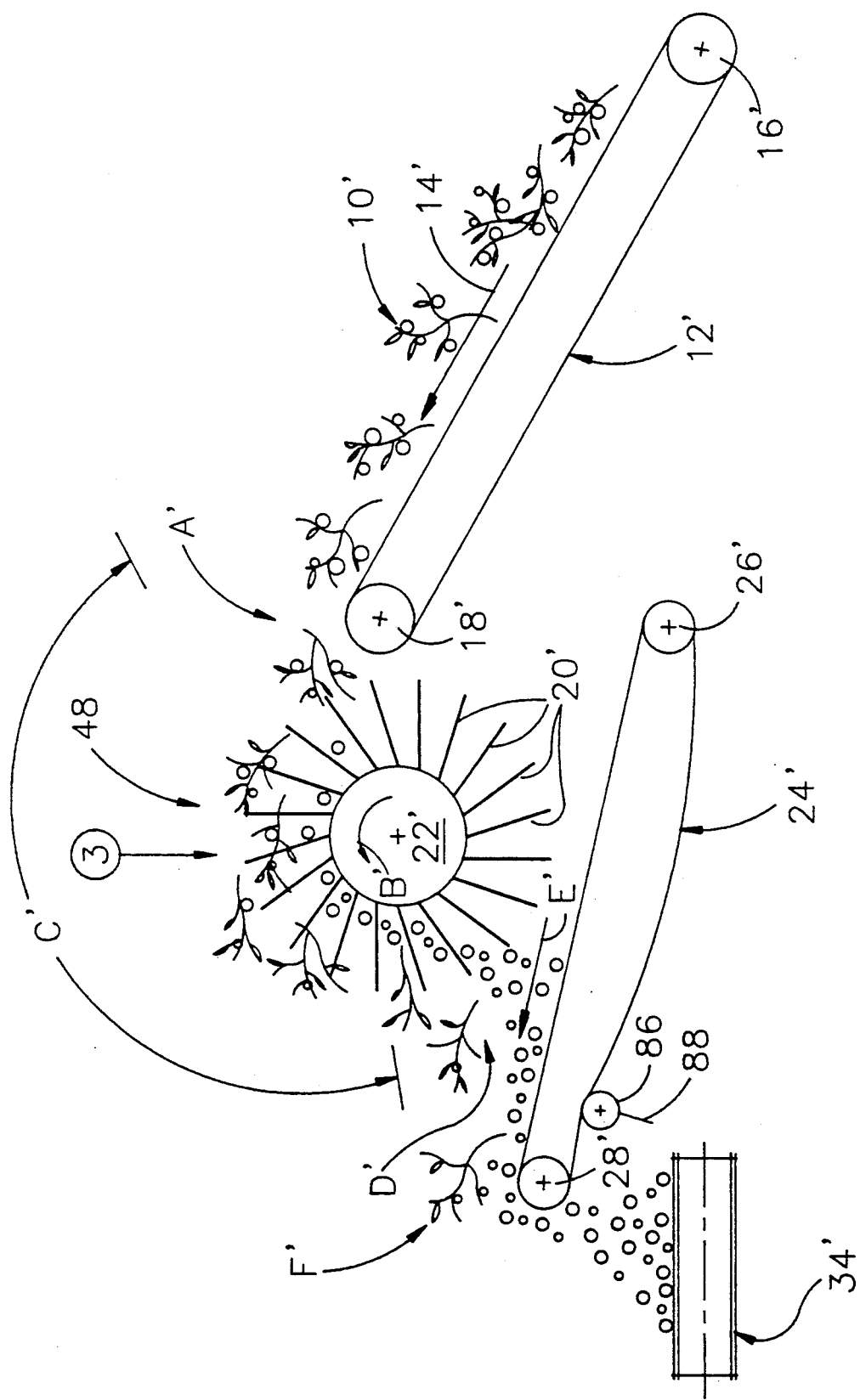
FIG. 2 is a schematic side elevation depicting aspects of the invention in an alternate embodiment.

FIG. 2 schematically illustrates a second embodiment of the invention, which is similar to that of the preferred embodiment illustrated in FIG. 1, but in which no secondary shaker hub and tines are present. Components in FIG. 2 correspond to components in FIG. 1 having the same numbers, with prime notation added. In the FIG. 2 embodiment, any suitable means may be used to remove the remaining vine mass at position F'. Among suitable means are, of course, vine chains; however using vine chains would necessarily result in lower operating efficiencies for the reasons noted above.

In practicing the invention in the embodiment illustrated schematically in FIG. 2, good performance has been achieved. While the performance has not been as exceptional as that of the FIG. 1 embodiment, the FIG. 2 embodiment may, under some field conditions, or for reasons of lower cost, be desirably used.

FIG. 6 illustrates tomato harvesting apparatus manifesting the preferred embodiment of the invention. The apparatus includes a frame 36 mounted on wheels 38, 40 for travel through the field being harvested. Frame 36 includes a suitable extension or tongue 42 for connection with a conventional farm tractor pulling the apparatus. Means cutting the tomato vine mass from its growing roots proximate the level of ground or grade 44 is designated generally 98 in FIG. 6. Preferably cutting means 98 is a conventional double disk apparatus.

Figure 3:
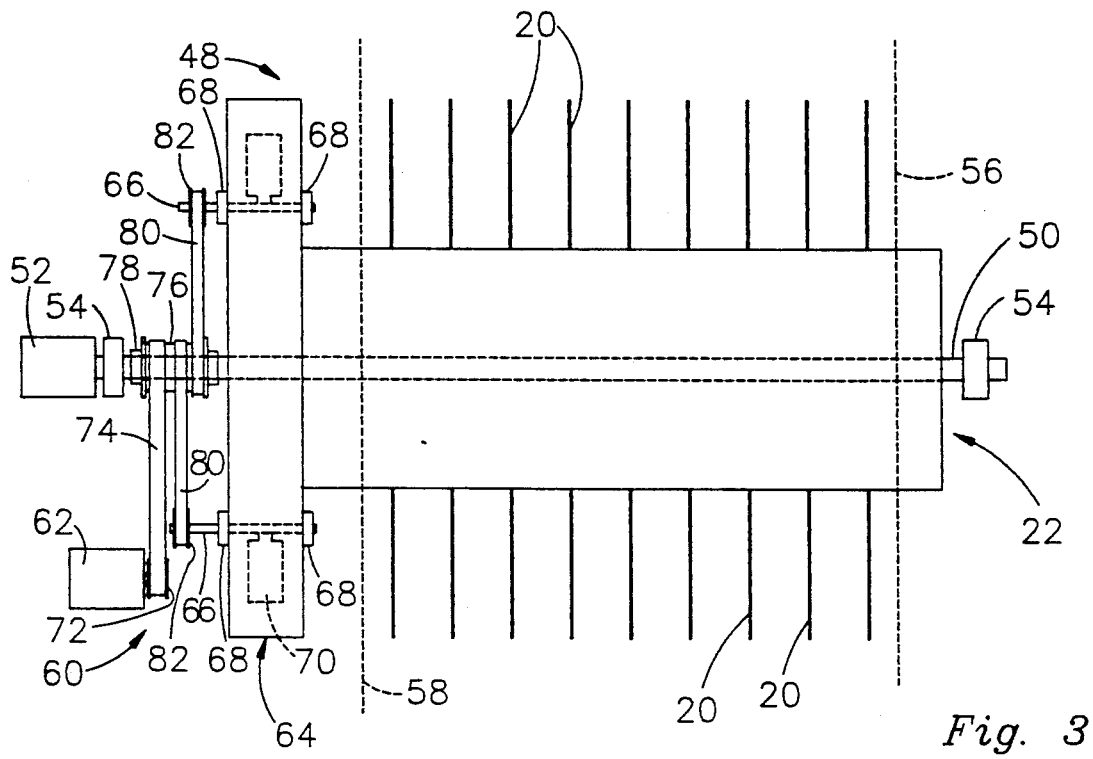
FIG. 3 is a top view, taken generally at the position indicated by arrow 3 in FIGS. 1, 2 and 6, illustrating a preferred embodiment of a primary shaker assembly manifesting aspects of the invention.

Referring to FIG. 3, a primary shaker assembly designated generally 48 includes first or primary shaker hub 22 and tines 20 extending in a generally radial direction therefrom. Shaker hub 22 is mounted fixedly on a shaft 50 drivingly rotated by a motor 52 which is preferably, but necessarily, a hydraulic motor. Shaft 50 is journaled in suitable bearings 54 which are fixed to frame 36 of the tomato harvester apparatus. The connection of the bearings 54 to frame 36 has not been illustrated in FIG. 3 to enhance drawing clarity.

Respective walls 56, 58 are shown in dotted lines in FIG. 3 and define respective sides of a shaker chamber. Walls 56, 58 are preferably sheet metal and are also fixedly connected to frame 36; this connection has not been shown to enhance drawing clarity. Primary shaker hub 22 extends through walls 56, 58 as illustrated; the openings in walls 56, 58 for shaker hub 22 fit closely about shaker hub 22.

Primary shaker assembly 48 further includes apparatus for imparting vibratory motion, which is preferably but not necessarily oscillatory motion, to shaker hub 22 and hence to tines 20. This vibratory motion imparting apparatus is designated generally 60 in FIG. 3 and includes a motor 62 which is preferably but not necessarily a hydraulic motor. Apparatus 60 further includes an eccentric weight box 64 having respective shafts 66 therewithin journaled in suitable bearings 68. Fixedly mounted on shafts 66 for unitary rotation therewith are eccentric weights 70. Eccentric weight box 64, together with shafts 66, bearings 68 and eccentric weights 70, rotates unitarily with shaft 50; eccentric weight box 64 is fixedly connected to shaft 50. Preferably shaft 50, eccentric weight box 64 and primary shaker hub 22 are all welded together.

Shafts 66 are driven by motor 62 via a series of belts which are preferably timing belts available from Browning Manufacturing Division of Emerson Electric Company in Maysville, Ky. and sold under the trademark "Gearbelt Drive". An unnumbered output shaft of motor 62 has a timing belt pulley 72 mounted thereon which turns unitarily with the output shaft of motor 62. A belt 74, which is also preferably a timing belt, fits around timing belt pulley 72 and a drive sprocket 76 mounted on shaft 50. Drive sprocket 76 is connected to shaft 50 by suitable bearings 78 which facilitate rotation of drive sprocket 76 independently of shaft 50. Further mounted on drive sprocket 76 are respective secondary drive belts 80, which are preferably timing belts as well and which fit about timing belt pulleys 82 fixedly mounted on shafts 66.

As the output shaft of motor 62 rotates, timing belt pulley 72 turns thereby moving timing belt 74 and rotating drive sprocket 76 about shaft 60. Rotation of drive sprocket 76 in turn has the effect of advancing belt 80 which in turn rotates timing belt pulleys 82 causing shafts 66 having eccentric weights 70 mounted thereon to rotate.

As the output shaft of motor 62 rotates, the rotation of eccentric weights 70, which are off of center respecting the axis of rotation of shafts 66, cause eccentric weight box 64 to oscillate or vibrate. Because eccentric weight box 64 is fixed to shaft 50 and rotates unitarily therewith, this oscillation or vibration of eccentric weight box 64 causes primary shaker hub 22 and tines 20 to vibrate, thereby imparting a vibratory or oscillatory motion to a tomato vine mass entwined about and carried by tines 20.

Close fitting but clearance arrangement between primary shaker hub 22 and shaker chamber walls 56, 58 results in walls 56, 58 not substantially vibrating as the output shaft of motor 62 turns.

Motors 52, 62 and bearings 54 are fixed to frame 36 of the tomato harvesting apparatus. These fixed connections have not been illustrated in FIG. 3 in order to aid drawing clarity. The connection of bearings 54 to frame 36 may be via struts 100 as illustrated in FIG. 6.

Figure 4:
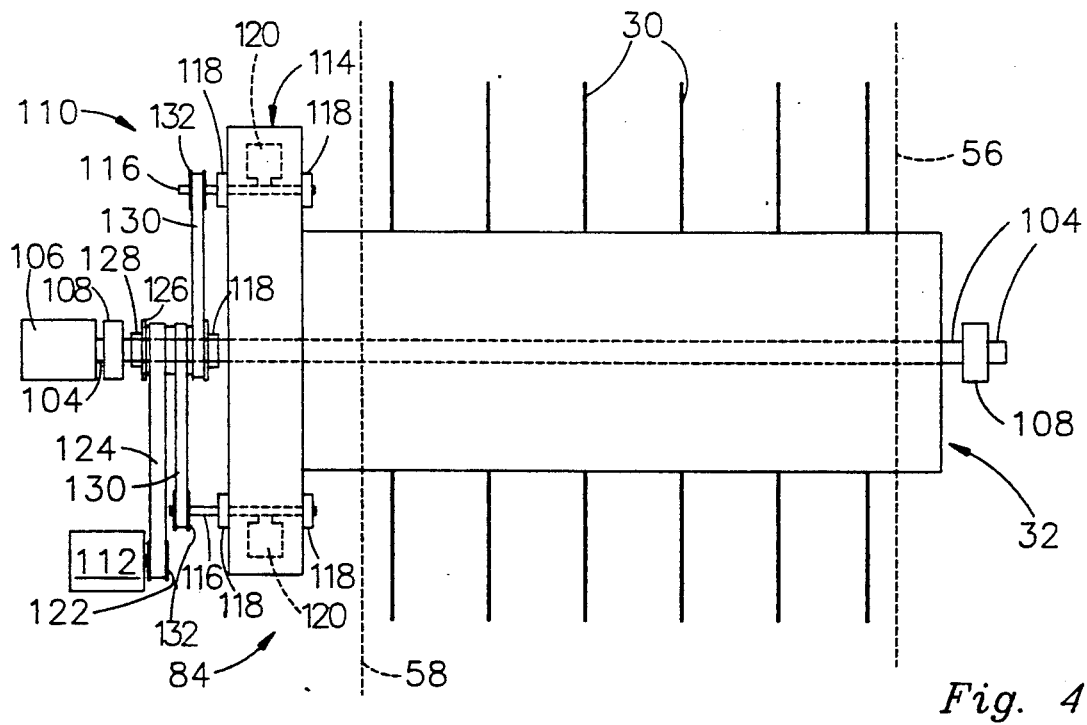
FIG. 4 is a top view, taken generally at the position indicated by arrow 4 in FIGS. 1 and 6, illustrating a preferred embodiment of a secondary shaker assembly manifesting aspects of the invention.

A secondary shaker assembly is illustrated in FIG. 4 and is designated generally 84. Secondary shaker assembly 84 is similar, but not identical, to primary shaker assembly 48 in size, shape, configuration and manner of operation. Secondary shaker assembly 84 includes second or secondary shaker hub 32 having tines 30 protruding therefrom.

Shaker hub 32 is mounted fixedly on a shaft 104 drivingly rotated by a motor 106 which is preferably, but necessarily, a hydraulic motor. Shaft 104 is journaled in suitable bearings 108 which are fixed to frame 36 of the tomato harvester apparatus. The connection of the bearings 108 to frame 36 is via struts 102, as illustrated in FIG. 6, but has not been illustrated in FIG. 4 to enhance drawing clarity.

Respective walls 56, 58 are shown in dotted lines in FIG. 4 and define respective sides of a secondary shaker chamber. Walls 56, 58 are preferably sheet metal and are also fixedly connected to frame 36; this connection has not been shown in FIG. 4 to enhance drawing clarity. Connection of wall 56 to frame 36 is illustrated in FIG. 6. Secondary shaker hub 32 extends through walls 56, 58 as illustrated; the openings in walls 56, 58 for shaker hub 32 fit closely about shaker hub 32.

Secondary shaker assembly 84 further includes apparatus for imparting vibratory motion, which is preferably but not necessarily oscillatory motion, to shaker hub 32 and hence to tines 30. This vibratory motion imparting apparatus is designated generally 110 in FIG. 4 and includes a motor 112 which is preferably but not necessarily a hydraulic motor. Apparatus 110 further includes an eccentric weight box 114 having respective shafts 116 therewithin journaled in suitable bearings 118. Fixedly mounted on shaft 116 for unitary rotation therewith are eccentric weights 120. Eccentric weight box 114, together with shafts 116, bearings 118 and eccentric weights 120, rotates unitarily with shaft 104; eccentric weight box 114 is fixedly connected to shaft 104, preferably by welding.

Shafts 116 are driven by motor 112 via a series of belts which are preferably timing belts available from Browning Manufacturing Division of Emerson Electric Company in Maysville, Ky. and sold under the trademark "Gearbelt Drive". An unnumbered output shaft of motor 112 has a timing belt pulley 122 mounted thereon which turns unitarily with the output shaft of motor 112. A belt 124, which is also preferably a timing belt, fits around timing belt pulley 112 and a drive sprocket 126 mounted on shaft 104. Drive sprocket 126 is connected to shaft 104 by a suitable bearings 128 which facilitate rotation of drive sprocket 126 independently of shaft 104. Further mounted on drive sprocket 126 are respective secondary drive belts 130, which are preferably timing belts as well, and which also fit about timing belt pulleys 132 fixedly mounted on shafts 116.

As the output shaft of motor 112 rotates, timing belt pulley 122 turns thereby moving timing belt 124 and rotating drive sprocket 126 about shaft 104. Rotation of drive sprocket 126 in turn has the effect of advancing belts 130 which in turn rotate timing belt pulleys 132 causing shafts 116 having eccentric weights 120 mounted thereon to rotate.

As motor 112 rotates, the rotation of eccentric weights 120, being off of center respecting the axes of rotation of shafts 116, cause eccentric weight box 114 to oscillate or vibrate. Because eccentric weight box 114 is fixed to shaft 104, this in turn causes secondary shaker hub 32 and tines 30 to vibrate, thereby imparting a vibratory or oscillatory motion to a "remaining vine mass" entwined about tines 30.

Close fitting but clearance arrangement between secondary shaker hub 32 and secondary shaker chamber walls 56, 58 results in walls 56, 58 not substantially vibrating as motor 106 turns the vibrating secondary shaker hub.

Motors 106, 112 and bearings 128 are fixed to frame 36 of the tomato harvesting apparatus. These fixed connections have not been illustrated in FIG. 4 in order to aid drawing clarity.

Figure 5:
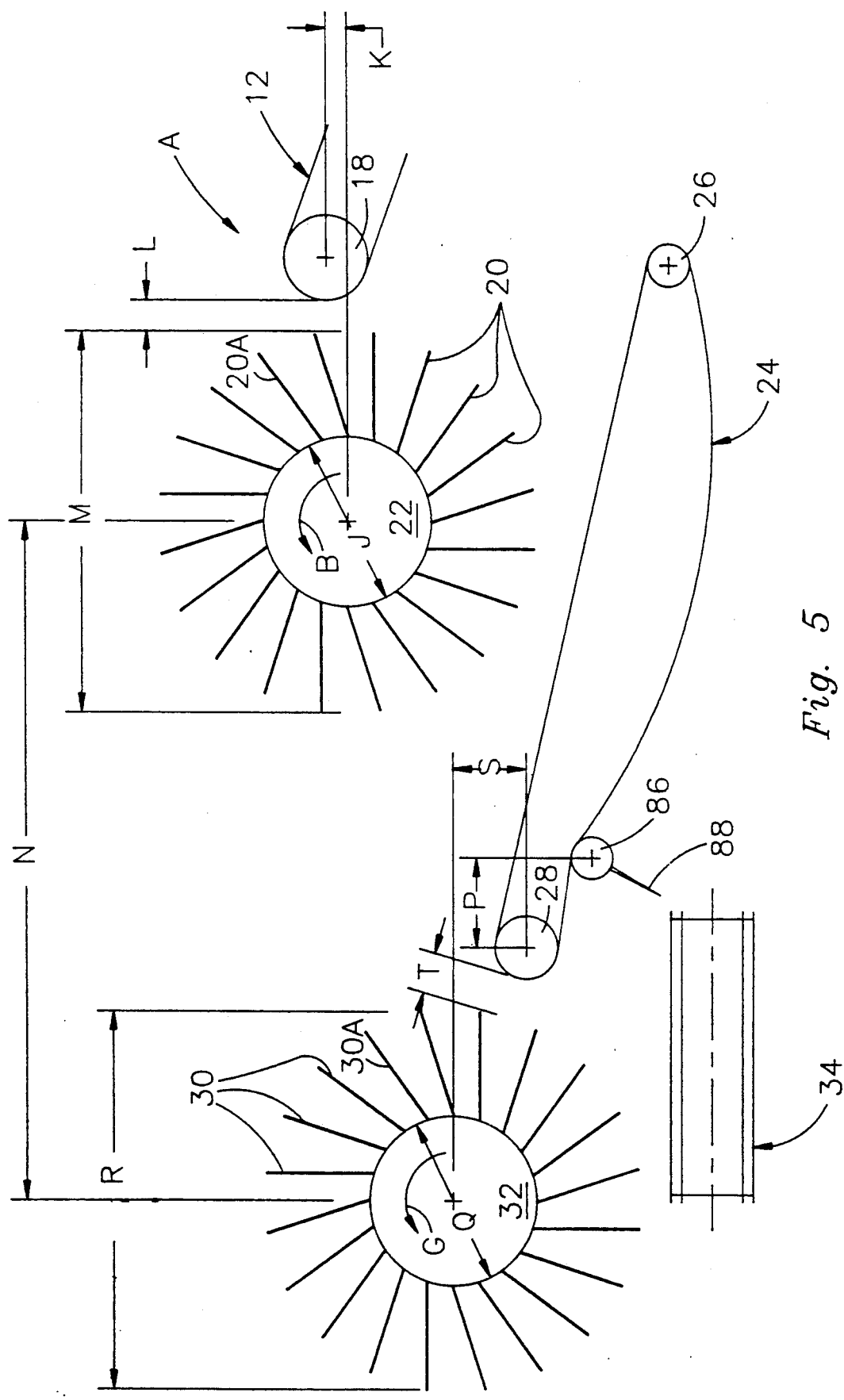
FIG. 5 is a schematic side elevation, similar to FIG. 1, illustrating geometric relationships in the preferred practice of the invention.

The apparatus illustrated in some detail in FIGS. 1, 3, 4 and 6 is illustrated schematically in FIG. 5. In FIG. 5, the axes of rotation of rollers 18, 26, 28 and 86 and the axes of rotation of primary and secondary shaker hubs 22 and 32 are represented by unnumbered crossed horizontal and vertical lines.

In the preferred practice of the invention, primary shaker hub 22 has an outer diameter J of sixteen (16) inches. Tines 20 are present as nine (9) axially spaced rows. of twenty (20) tines each, mounted on primary shaker hub 22. The tines 20 are illustrated in FIG. 5 and the nine (9) axially spaced rows appear in FIG. 3.

Roller 18, which is rotated by a preferably hydraulically driven motor to drive conveyer 12, is eight (8) inches in diameter with the axis of rotation of roller 18 two (2) inches above the axis of rotation of primary shaker hub 22, as indicated by dimension K in FIG. 5. In the preferred practice of the invention, the distance between the tips of tines 20 and conveyer 12, at a position of closest approach therebetween, is three (3) inches, as indicated by dimension L in FIG. 5. Tines 20 are positioned to provide an overall outer diameter of the assembly of tines 20 and primary shaker hub 22 of thirty-six (36) inches, as indicated by dimension M in FIG. 5.

Axes of rotation of first and second shaker hubs 22, 32 are horizontally spaced a distance of sixty-four (64) inches as indicated by dimension N in FIG. 5. Roller 28 is preferably a six (6) inch diameter drive roller while idler roller 86 is preferably a four (4) inch diameter roller. The axis of rotation of drive roller 28 is preferably horizontally spaced from the axis of rotation of idler roller 86 a distance of nine (9) inches, as indicated by dimension P in FIG. 5. Secondary shaker hub 32 has an overall outer diameter of sixteen (16) inches as indicated by dimension Q in FIG. 5 while the assembly of secondary shaker hub 32 and tines 30 has an overall outer diameter of thirty-six (36) inches as indicated by dimension R in FIG. 5.

The axis of secondary shaker hub 32 in the preferred practice of the invention is vertically displaced seven (7) inches above the axis of rotation of roller 28 as indicated by dimension S in FIG. 5. Tines 30, at the position of closest approach to conveyer 24, are spaced from conveyer 24 a distance of four (4) inches as indicated by dimension T in FIG. 5.

In the preferred practice of the invention, tines 30 are arranged in six (6) axially spaced rows along hub 32 with 20 tines in each row. The axially spacing of the rows is illustrated in FIG. 4, while the 20 tines per row arrangement is illustrated in FIG. 5.

Preferably both tines 20 and tines 30 are fiberglass. Further preferably tines 20 and tines 30 are both skew or canted from the radial direction so that as shaker hubs 22, 32 rotate in the direction indicated by arrows B, G respectively, tips of respective tines intersect an imaginary horizontal plane through the axis of rotation of the respective hubs before the positions of hub-tine connection intersect such horizontal plane. This is illustrated by tines 20A and 30A in FIG. 5.

Referring to FIG. 3, in the preferred practice of the invention, tines 20 are disposed in rows axially spaced four (4) inches apart with two (2) inches of space between the axially extreme rows of tines and walls 56, 58. Inner surfaces of walls 56, 58 are thirty-seven inches apart.

The sixteen (16) inch outer diameter dimension for hubs 22, 32 materially assists in preventing tomato vines from becoming entwined or ensnarled about the hubs 22, 23 and thereby resisting disengagement from tines 20, 30 at respective disengagement positions D, I.

The hubs 22, 32 may been constructed in somewhat smaller diameter with the tines fixed in position. After construction, pieces of flexible foam may be placed annularly around hubs 22, 32 in cylindrical disposition between the axially spaced rows of tines to provide the sixteen (16) inch outer diameter found to be desirable. The foam helps to present a smooth, even sixteen (16) inch diameter surface thereby preventing the tomato vines from hanging up in the structure of screws, nuts and bolts which are used to hold circumferential rings. within which tines 20, 30 are mounted, on to hubs 22, 32. In practice, the hubs on which the tines have been mounted are generally of smaller diameter than the desired sixteen inches; placement of the foam about the hubs provides the desired sixteen inch diameter.

In muddy conditions, use of the foam may not be necessary or even desirable, especially on the primary shaker. When the foam is not used in muddy conditions, mud and dirt quickly build-up on the primary hub 22 and effectively provide a sufficiently large outer diameter for hub 22 that vines do not become entangled about the hub.

A lid 90, illustrated in FIG. 6, is hinged at its front edge 92 and is illustrated in FIG. 6 in a raised position. Lid 90 is curved so that when it is in the "down" position, lid 90 fits reasonably closely about the outer periphery of tines 20 to define, together with walls 56, 58, a primary shaking chamber. The unnumbered hinges provided at front edge 92 of lid 90 permit lid 92 to be lifted if a large wad or mass of vines is delivered to the primary shaker assembly by conveyer 12; the hinging and lifting action of lid 90 prevents the vines from being stuck in the primary shaking chamber. As the lid lifts, it permits the assembly of tines 20 and shaker hub 22 to carry the vines through the arcuate path defined by subtended angle C in FIG. 1. Once the large wad of vines has passed, lid 90 falls back into position.

Operation of lid 90 is important because during the shaking process, tomatoes more or less fly around within the primary shaking chamber as the tomatoes are shaken off the vines. Distance between the ends of tines 20 and lid 90 is minimized by design, preferably being only about an inch or two. This is desirable because as the tomatoes fly around while being shaken off the vines, if lid 90 is much farther away from tines 20, more bruising of the fruit occurs. With lid 90 fitting relatively closely about the ends of tines 20, bruising is minimized.

Attached to a rear edge of lid 90 is a piece of flexible material, preferably felt or belting material, denoted 94 in FIG. 6, which hangs from the trailing edge of lid 90 to maintain a surface in close proximity to the ends of tines 20 and further defining the primary shaking chamber. Felt, belting or other flexible material 94 prevents fruit shaking from tines 20 from flying backwards toward secondary shaker hub 32 and the remainder of secondary shaker assembly 84. This further minimizes bruising of the fruit. Fruit striking flexible material 94 drops down onto conveyer 24. Flexible material 94 prevents fruit from flying backward and landing on vines being carried by conveyer 24 to secondary shaker assembly 84, where that fruit might tend to be carried out of the harvesting apparatus with the vines and thereby lost.

The relative positioning of conveyer 12 respecting primary hub 22 and tines 20 and the relative positioning of conveyer 24 respecting the secondary hub 32 and tines 30 are similar. This positioning and geometry, as illustrated and as defined by dimensions in FIG. 5, together with the geometry and dimensions of the tines and hubs set forth generally in FIGS. 3 and 4 and the material characteristics (flexibility and substantial vibrational motion transmitting capability) of the fiberglass tines, has produced highly satisfactory results. The geometry and spacing provide sufficient space for fruit removed from the vines to fall for conveyance to a sorting position.

Hydraulic motors are preferably used throughout the apparatus of the invention to power the various components. Hydraulic motors are preferable in that hydraulic motors allow slippage so that if a rock is encountered or if a part breaks or if some vines become stuck in the apparatus, the hydraulic motors slip and stop rotating. Use of a more positive type of drive could result in the machine breaking in the event a rock was encountered and all of the moving parts were forced to continue moving. The hydraulic motors preferably used in practicing the invention are provided with speed controls to vary their speed and thereby vary the speed of the harvesting equipment components during operation.

Respecting the primary and secondary shaker assemblies 48, 84, in the secondary shaker box eccentric weights 120 rotate about shafts 116 that are more closely spaced than corresponding shafts 66 in eccentric weight box 64. Close spacing of the shafts on which the eccentric weights are mounted in the secondary shaker assembly provides a more jittery or jigging type of action for the secondary shaker. This shorter, more jittery shaking stroke or motion imparted to tines 30 results in the tips of tines 30 oscillating perhaps only one or two inches whereas the tips of tines 20 may oscillate four, five or six inches.

The smaller dimensions and smaller weights of eccentric weight box 114 of secondary shaker assembly 84 permit the weights to be rotated faster. The resulting higher frequency vibration or oscillation tends to shake more loose but entrapped tomatoes out of the vines and enhances discharge of the vines from tines 30 and secondary shaker hub 32.

At the primary shaker assembly, the vine mass is heavier because the vine mass includes the tomato fruit. As a result, stronger shaking, with greater amplitude, is required at the primary shaker. This is provided by larger spacing of the pulleys, belts, weights and shafts of the primary shaker assembly and heavier eccentric weights 70 relative to those used in the secondary shaker.

In the secondary shaker assembly, because the tomato vines have lost most of the tomatoes, shaking need not be so forceful. However, higher frequency shaking is desirable to dislodge tomatoes which are entrapped within the vine mass and further to ensure that the vine mass disengages from tines 30.

A driven drum 300, as illustrated in dotted lines in FIG. 1, may be used to prevent vine build-up on the secondary shaker. However, this is an optional feature and is not used in the preferred practice of the invention.

Each of the two shaker assemblies have two hydraulic fluid flow controls. One control regulates speed of rotation of the center shaker hub and the other control regulates magnitude of the oscillation or vibrations. Magnitude of the oscillation is varied by regulating the speed of rotation of eccentric weights by regulating speed of rotation of motors 62, 112. Regulation of speed of rotation of the shaker hub is performed by regulating speed of rotation of hydraulic motors 52, 106.

Optionally, to prevent vine build-up, especially on primary shaker hub 22, a relatively loosely fitting annular netting 96, illustrated in dotted lines in FIG. 6, may be provided. This netting prevents dirt from building up on the primary shaker hub 22. Upon encountering netting 96, dirt drops down from primary shaker hub 22, travelling downwardly along conveyer 24 in the direction opposite to arrow E in FIG. 1 and thereafter dropping from the harvesting apparatus.

Note that in FIG. 6, the dotted line circles indicate the outer periphery of tines 20, 30 respectively.

As illustrated in FIGS. 1, 2, 5 and 6, an idler roller 86 may be provided for conveyer 24 on the return from roller 28 to roller 26. Idler roller 86 preferably is positioned to cause conveyer 24 to rise slightly as conveyer 24 passes over roller 86; idler roller 86 helps prevent build-up of mud on conveyer 24 and prevents recycling of vines which failed to engage tines 30 at position F. Vines carried by conveyer 24 and encountering roller 86 drop from conveyer 24 to the ground. Idler roller 86 is displaced laterally, to the right in FIG. 5, from fruit carriage conveyer 34 so that vines removed from conveyer 24 by idler roller 86 do not fall onto fruit carriage conveyer 34. Scraper 88 prevents vines removed by roller 86 from conveyer 24 from wrapping around roller 86. Roller 86 and scraper 88 contribute to better operation in muddy conditions.

The apparatus of the invention preferably includes a leveling device to level the apparatus when operating on hilly terrain. Separate, independent control of the tomato vine cutting means is provided so that the cutting means, depicted as disk 98 in FIG. 6, can be moved along essentially tangent to the ground, despite the fact that the main portion of the tomato harvesting apparatus is level. In this position, conveyer 12 twists slightly as it provides the path between cutting disk 98 and primary shaker assembly 48.

Tines 20, 30 are preferably about three-eighth inch diameter fiberglass. Life of tines 20, 30 can be increased by utilizing three-eighth inch inner diameter, five-eighth inch outer diameter rubber sleeves over the fiberglass tines. The rubber surfacing provides a desirable amount of slipping adhesion between the tomato vines and tines so that the tines successfully engage the tomato vines, carry the tomato vines and then discharge the tomato vines during operation of the invention.

During operation, motors 52 and 106 preferably drive hubs 22 and 32 at about thirty (30) revolutions per minute; this can vary depending on the speed at which the harvesting equipment is pulled through the field, the condition of the crop, etc. Motors 62 and 112 preferably provide rotational output motion at from about 600 to about 900 revolutions per minute with 700 revolutions per minute being most desirable. The eccentric weights 70 in the primary shaker eccentric weight box are preferably seventy (70) pounds each while the eccentric weights 120 in the secondary shaker eccentric weight box are preferably twenty-six (26) pounds each. The distance from the centerlines or axes of shafts 66 to the centerline or axis of shaft 50 in the primary shaker eccentric weight box is eleven and three-quarter (11¾) inches. The distance from the centerlines or axes of shafts 116 to the centerline or axis of shaft 104 in the secondary shaker eccentric weight box is seven and one-eighth (7⅛) inches. The distance from the center of gravity of the weights 70 to the centerlines or axes of shafts 66 is about four and three-eighths (4⅜) inches. The distance from the center of gravity of the weights 120 to the centerlines or axes of shafts 132 is about three and one-eighth (3⅛) inches.

Suitable conveyors for use as conveyors 12, 24 and 34, as well as sprockets, rollers and other conventional components used with such conveyors, are available from Broekema Beltway, Inc., P.O. Box 788, Spaulding Building, Pocatello, Id., 83201 and are sold under the trademark "Broekema System".

While the foregoing represents a description of the best mode presently known for practicing the invention, in such terms as are believed to enable one of ordinary skill in the relevant are to make and practice the invention, the invention is not limited to the foregoing. The invention is defined by the claims appended to this application and encompasses not only everything literally covered by the claims, but substantially equivalent structures and substantially equivalent methods, either of which perform substantially the same function in substantially the same way to achieve substantially the same result as the invention in the various ways it is claimed herein.

I claim the following:

1. Apparatus for harvesting vinous row crops such as tomatoes, comprising:
   a. means for cutting a fruit-carrying vine mass of said crop from its growing roots;
   b. first means, receiving said vine mass from said cutting means, for imparting vibratory motion to said vine mass to break fruit from vines of said vine mass, comprising:
      i. a first rotatable shaker;
      ii. means for drivingly rotating said first shaker and imparting vibratory motion thereto during rotation thereof;
      iii. means extending from said shaker for engaging said vine mass and vibratingly carrying said vine mass along a first arcuate path over said first shaker as said first shaker rotates;
   c. means, below said first means for imparting vibratory motion to said vine mass, for
      i. catching and conveying fruit, separated from said vines, to a fruit discharge position, and
      ii. conveying a vine mass portion remaining upon disengagement from said first shaker to a position of engagement with second means for imparting vibratory motion to said vine mass remaining portion to free entrapped fruit therefrom;
   d. said second means for imparting vibratory motion to said vine mass remaining portion comprising:
      i. a second rotatable shaker;
      ii. means for drivingly rotating said second shaker and imparting vibratory motion thereto during rotation thereof;
      iii. means extending from said second shaker for engaging said remaining vine mass portion received from said catching and conveying means and vibratingly carrying said remaining vine mass along a second arcuate path over said second shaker as said second shaker vibratingly rotates;
   e. said fruit catching and conveying means extending under said second vibratory motion imparting means for catching and conveying fruit which had been entrapped within said vine mass to said fruit discharge position.

2. Apparatus of claim 1 wherein said means protruding outwardly from said shaker for engaging said vine mass and carrying said vine mass over the first shaker as the first shaker rotates includes first shaker tines positioned such that when the point of intersection of said tine and said shaker is on a horizontal axis, the extremity of the tine remote from the shaker is displaced from horizontal in a direction to be the portion of said tine to first encounter said vine mass as said shaker rotates.

3. Apparatus for harvesting vinous row crops such as tomatoes, comprising:
   a. means for cutting a fruit-carrying vine mass of said crop from its growing roots;
   b. means, receiving said vine mass from said cutting means, for imparting vibratory motion to said vine mass to break fruit from vines of said vine mass, comprising:
      i. a rotatable shaker;
      ii. means for drivingly rotating said shaker and imparting vibratory motion thereto during rotation thereof;
      iii. means, extending from said shaker, for freely substantially engaging said vine mass and vibratingly carrying said vine mass along an arcuate path over said shaker, as said shaker vibratingly rotates, to a vine mass discharge position where arcuate path is downwardly directed;
   c. means, below said means for imparting vibratory motion to said vine mass, for catching and conveying fruit broken from said vines away from said vine mass.

4. Apparatus of claim 3 wherein said means protruding outwardly from said shaker for engaging said vine mass and carrying said vine mass over the first shaker as the first shaker rotates includes first shaker tines positioned such that when the point of intersection of said tine and said shaker is on a horizontal axis, the extremity of the tine remote from the shaker is displaced from horizontal in a direction to be the portion of said tine to first encounter said vine mass as said shaker rotates.

5. Apparatus of claim 3 wherein said arcuate path subtends an angle of about 180° about a shaker axis of rotation.

6. Apparatus of claim 3 wherein the vine mass discharge position is proximate a horizontal axis of said shaker.

7. Apparatus of claim 3 wherein said means for engaging said vine mass extend from said shaker to carry said vine mass initially upwardly over said shaker and then to discharge said vine mass before reaching a lower extremity of said arcuate path.

8. Apparatus for harvesting tomatoes, comprising:
   a. means for cutting a tomato-carrying vine mass of said crop from its growing roots;
   b. first means, receiving said vine mass from said cutting means, for imparting vibratory motion to said vine mass to break tomatoes from vines of said vine mass, comprising:
      i. a first cylindrical shaker head rotatable about a substantially horizontal axis;
      ii. means for drivingly rotating said first shaker head about said axis including means for imparting vibratory motion to said first shaker head during rotation thereof;
      iii. a plurality of tines protruding outwardly from the curved periphery of said shaker head in a direction skew to radial to liftingly engage said vine mass as tips of said tines travel in a generally upward direction, thereby lifting and carrying said vine mass over the shaker head in a generally arcuate path;

c. means, positioned below said first means for imparting vibratory motion to said vine mass, for
  i. catching and conveying tomatoes broken from said vines of said vine mass to a tomato discharge position, and
  ii. conveying the vine mass portion remaining upon disengagement from said tines of said first shaker head to a position for engaging second means for imparting vibratory motion to said vine mass remaining portion to free tomatoes entrapped therein;
d. said second means for imparting vibratory motion to said vine mass remaining portion comprising:
  i. a second cylindrical shaker head rotatable about a substantially horizontal axis;
  ii. means for drivingly rotating said second shaker head about said axis including means for imparting vibratory motion to said second shaker head during rotation thereof;
  iii. a plurality of tines protruding outwardly from the curved periphery of said second shaker head in a direction skew to the radial direction to engage said remaining vine mass portion received from said conveying means as tips of said tines travel in a generally upward direction, thereby carrying said vine mass over said second shaker head;
e. said tomato catching and conveying means extending under said second vibratory motion imparting means for catching and conveying tomatoes which had been broken from said vines but entrapped within said vine mass to said tomato discharge position.

9. Apparatus of claim 8 wherein said tines of said first shaker are in axially spaced circumferential rows about said cylindrical shaker head.

10. Apparatus of claim 9 wherein said tines of said second shaker are in axially spaced circumferential rows about said cylindrical second shaker head.

11. Apparatus of claim 10 wherein said second cylindrical shaker head is substantially smooth other than for said tines.

12. Apparatus of claim 8 wherein said tines of said first shaker are evenly spaced circumferentially about said cylindrical shaker head.

13. Apparatus of claim 12 wherein said first cylindrical shaker head is substantially smooth other than for said tines.

14. Apparatus of claim 8 wherein said tines of said first shaker are positioned such that when the point of intersection of said tine and said shaker head is on a horizontal axis, the extremity of the tine remote from the shaker head is displaced from said horizontal axis in a direction to be the portion of said tine to first encounter said vine mass as said shaker head rotates.

15. Apparatus of claim 14 further comprising means for upwardly conveying said vine mass from said cutting means to said first means for imparting vibratory motion, delivering said vine mass to said vibratory motion imparting means at a position above the axis of rotation of said first cylindrical shaker head.

16. Apparatus of claim 15 wherein said means for conveying said vine mass portion remaining upon disengagement from said first shaker head to said position for engaging second means for imparting vibratory motion to said vine mass remaining portion to free tomatoes entrapped therein delivers said vine mass portion remaining to said second means for imparting vibratory motion at a position below said axis of rotation of said second cylindrical shaker head.

17. Apparatus of claim 16 wherein said means for conveying said vine mass portion remaining upon disengagement from said first shaker head to said position for engaging second means for imparting vibratory motion to said vine mass remaining portion to free tomatoes entrapped therein conveys said vine mass remaining portion upwardly.

18. Apparatus of claim 14 wherein said first shaker head axis of rotation is higher than said second shaker head axis.

19. Apparatus of claim 8 wherein said first shaker head axis of rotation is higher than said second shaker head axis.

20. Apparatus of claim 8 wherein said tines of said first shaker are evenly spaced circumferentially about said cylindrical shaker head.

21. Apparatus for harvesting tomatoes, comprising:
a. means for cutting a tomato-carrying vine mass of said crop from its growing roots;
b. first means, receiving said vine mass from said cutting means, for imparting vibratory motion to said vine mass to break tomatoes from vines of said vine mass, comprising:
  i. a first cylindrical shaker head rotatable about a substantially horizontal axis;
  ii. means for drivingly rotating said first shaker head about said axis including means for imparting vibratory motion to said first shaker head during rotation thereof;
  iii. a plurality of tines protruding outwardly from the curved periphery of said shaker head in a direction skew to radial to engage said vine mass as tips of said tines travel in a generally upward direction, thereby carrying said vine mass over the shaker head;
    (1) said tines of said first shaker being in axially spaced circumferential rows about said cylindrical shaker head;
    (2) said tines of said first shaker being evenly spaced circumferentially about said cylindrical shaker head;
    (3) said tines of said first shaker being positioned such that when the point of intersection of said tine and said shake head is on a horizontal axis, the extremity of the tine remote from the shaker head is displaced from said horizontal axis in a direction to be the portion of said tine to first encounter said vine mass as said shaker head rotates;
c. means, positioned below said first means for imparting vibratory motion to said vine mass, for
  i. catching and conveying tomatoes broken from said vines of said vine mass to a tomato discharge position, and
  ii. conveying the vine mass portion remaining upon disengagement from said tines of said first shaker head to a position for engaging second means for imparting vibratory motion to said vine mass remaining portion to free tomatoes entrapped therein;
d. said second means for imparting vibratory motion to said vine mass remaining portion comprising:
  i. a second cylindrical shaker head rotatable about a substantially horizontal axis;
  ii. means for drivingly rotating said second shaker head about said axis including means for imparting vibratory motion to said second shaker head during rotation thereof;

iii. a plurality of tines protruding outwardly from the curved periphery of said second shaker head in a direction skew to the radial direction to engage said remaining vine mass portion received from said conveying means as tips of said tines travel in a generally upward direction, thereby carrying said vine mass over said second shaker head; said tines of said second shaker head (1) being in axially spaced circumferential rows about said cylindrical second shaker head; and (2) being evenly spaced circumferentially about said cylindrical shaker head.

22. A method for harvesting tomatoes comprising:

a. cutting a tomato-carrying vine mass from its growing roots;

b. carrying said vine mass along a first arcuate path by first lifting said vine mass and then lowering said vine mass while imparting vibratory motion to said vine mass to break tomatoes from vines of said mass;

c. catching broken from said vines and conveying said tomatoes to a discharge position;

d. conveying the vine mass portion remaining along a second arcuate path by first lifting said remaining portion and then lowering said remaining portion while imparting vibratory motion thereto;

e. catching falling tomatoes, which had been broken from said vines but entrapped in said vine mass, while said vine mass is having vibratory motion imparted thereto for the second time, and conveying said caught tomatoes to said discharge position.

23. The method of claim 22 wherein the first vibratory motion is of grater amplitude than the second.

24. The method of claim 22 wherein said second vibratory motion is of higher frequency than the first.

* * * * *